(12) United States Patent
Albano et al.

(10) Patent No.: US 8,473,769 B2
(45) Date of Patent: *Jun. 25, 2013

(54) EFFICIENT ROUTING OF COMPUTING TASKS

(75) Inventors: Gherardo Albano, Rome (IT); Francesco M. De Collibus, Milan (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/421,323

(22) Filed: Mar. 15, 2012

(65) Prior Publication Data

US 2012/0173912 A1 Jul. 5, 2012

Related U.S. Application Data

(63) Continuation of application No. 12/778,762, filed on May 12, 2010.

(30) Foreign Application Priority Data

Dec. 10, 2009 (EP) ..................................... 09178632

(51) Int. Cl.
*G06F 1/00* (2006.01)
*G06F 1/32* (2006.01)

(52) U.S. Cl.
USPC ........... 713/340; 713/300; 713/320; 713/330; 709/201; 709/203

(58) Field of Classification Search
USPC .................. 713/300, 320, 330, 340; 709/201, 709/203
See application file for complete search history.

(56) References Cited

U.S. PATENT DOCUMENTS

| | | | |
|---|---|---|---|
| 6,574,605 B1 | 6/2003 | Sanders et al. |
| 6,587,831 B1 | 7/2003 | O'Brien |
| 6,944,862 B2 | 9/2005 | Caggese et al. |
| 7,050,424 B2 | 5/2006 | Cheng et al. |
| 7,302,450 B2 | 11/2007 | Benedetti et al. |
| 7,406,689 B2 | 7/2008 | Berstis et al. |
| 7,437,459 B2 | 10/2008 | Chidambaran et al. |
| 7,558,856 B2 | 7/2009 | Moulton et al. |
| 2003/0011348 A1 | 1/2003 | Lof et al. |
| 2006/0047808 A1 | 3/2006 | Sharma et al. |

(Continued)

OTHER PUBLICATIONS

USPTO U.S. Appl. No. 12/778,762, 1 page.

(Continued)

*Primary Examiner* — Kim Huynh
*Assistant Examiner* — Michael J Brown
(74) *Attorney, Agent, or Firm* — Francis Lammes; Stephen J. Walder, Jr.; John D. Flynn

(57) ABSTRACT

A mechanism is provided for routing a computing task to a computing resource for executing the computing task. A dispatcher receives a timestamp at which execution of the computing task can start on the computing resource and a duration that the execution would take. The computing resource is associated with a power consumption profile. The dispatcher estimates a power efficiency factor as a function of the power consumption profile, the timestamp and the duration thereby forming an estimated power efficiency factor. The dispatcher determines whether the computing resource can execute the computing task as a function of the estimated power efficiency factor. The dispatcher then sends the computing task to the computing resource in responsive to determining that the computing resource can execute the computing task.

9 Claims, 3 Drawing Sheets

U.S. PATENT DOCUMENTS

2008/0184230 A1* 7/2008 Leech et al. .......... 718/100
2009/0158286 A1 6/2009 Carteri et al.
2009/0216883 A1 8/2009 Fellenstein et al.

OTHER PUBLICATIONS

"Google Wins Floating Data Center Patent", http://blogs.zdnet.com/BTL/?p=17266, downloaded on Apr. 19, 2010, 2009, 2 pages.

"Method and System for Demand and Resource Mapping in a Cloud Computing System", www.IP.com No. IPCOM000181002D, IBM Corporation, Mar. 23, 2009, 4 pages.

"Peer-to-Peer Control System for Environmentally Responsible Downloads", www.IP.com No. IPCOM000179027D, IBM Corporation, Feb. 4, 2009, 4 pages.

"Using computers in power substations as neighbourhood cloud computing center", www.IP.com No. IPCOM000182911D, Disclosed Anonymously, May 8, 2009, 2 pages.

Chen, Gong et al., "Energy-Aware Server Provisioning and Load Dispatching for Connection-Intensive Internet Services", ftp://ftp.research.microsoft.com/pub/tr/TR-2007-130.pdf, 2007, 16 pages.

Francis, Kevin et al., "Green Maturity Model for Virtualization", Microsoft, Green Computing, The Architecture Journal # 18, http://www.ecoseed.org/whitePapers/Green_Computing-AJ18_EN.pdf, 2008, 44 pages.

Laitner, John A. et al., "Semiconductor Technologies: The Potential to Revolutionize U.S. Energy Productivity", American Council for an Energy-Efficient Economy, Report No. E094, http://www.sia-online.org/galleries/Publications/ACEEE_Report_2009.pdf, May 2009, 67 pages.

Pandey, Suraj et al., "Scheduling and Management Techniques for Data—Intensive Application Workflows", http://www.gridbus.org/~raj/papers/DataIntensiveWorkflowsScheduling2009.pdf, 2009, 23 pages.

\* cited by examiner

EFFICIENT ROUTING OF COMPUTING TASKS

This application is a continuation of application Ser. No. 12/778,762, filed May 12, 2010, status pending.

BACKGROUND

The present invention relates to a method and system for routing efficiently computing requests to computing resources, and in particular to optimize that routing according to environmental elements.

As cloud computing is more widely used to distribute execution of computer jobs or tasks, the need for an optimized distribution of computing tasks across multiple computers or sites has increased.

The access to cloud services by a client is very often agnostic of where the cloud service is located. Location is in general only considered for bandwidth and network latency reasons, so that the time needed to transfer data across networks is minimized. Some systems have put in place an affinity between clients and servers which are located closely so that requests from such clients are preferentially sent to the closest servers.

SUMMARY

In one illustrative embodiment, a method, in a data processing system, is provided for routing a computing task to a computing resource for executing the task. The illustrative embodiment receives a timestamp at which execution of the computing task can start on the computing resource and a duration that the execution would take. In the illustrative embodiment, the computing resource is associated with a power consumption profile. The illustrative embodiment estimates a power efficiency factor as a function of the power consumption profile, the timestamp and the duration thereby forming an estimated power efficiency factor. The illustrative embodiment determines whether the computing resource can execute the computing task as a function of the estimated power efficiency factor. Responsive to determining that the computing resource can execute the computing task, the illustrative embodiment sends the computing task to the computing resource.

In other illustrative embodiments, a computer program product comprising a computer useable or readable medium having: a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed. description of the example embodiments of the present invention.

BRIEF DESCRIPTION OF THE SEVERAL VIEWS OF THE DRAWINGS

Embodiments of the present invention will now be described by way of example with reference to the accompanying drawings in which like references denote similar elements, and in which.

DETAILED DESCRIPTION

Figure 1:
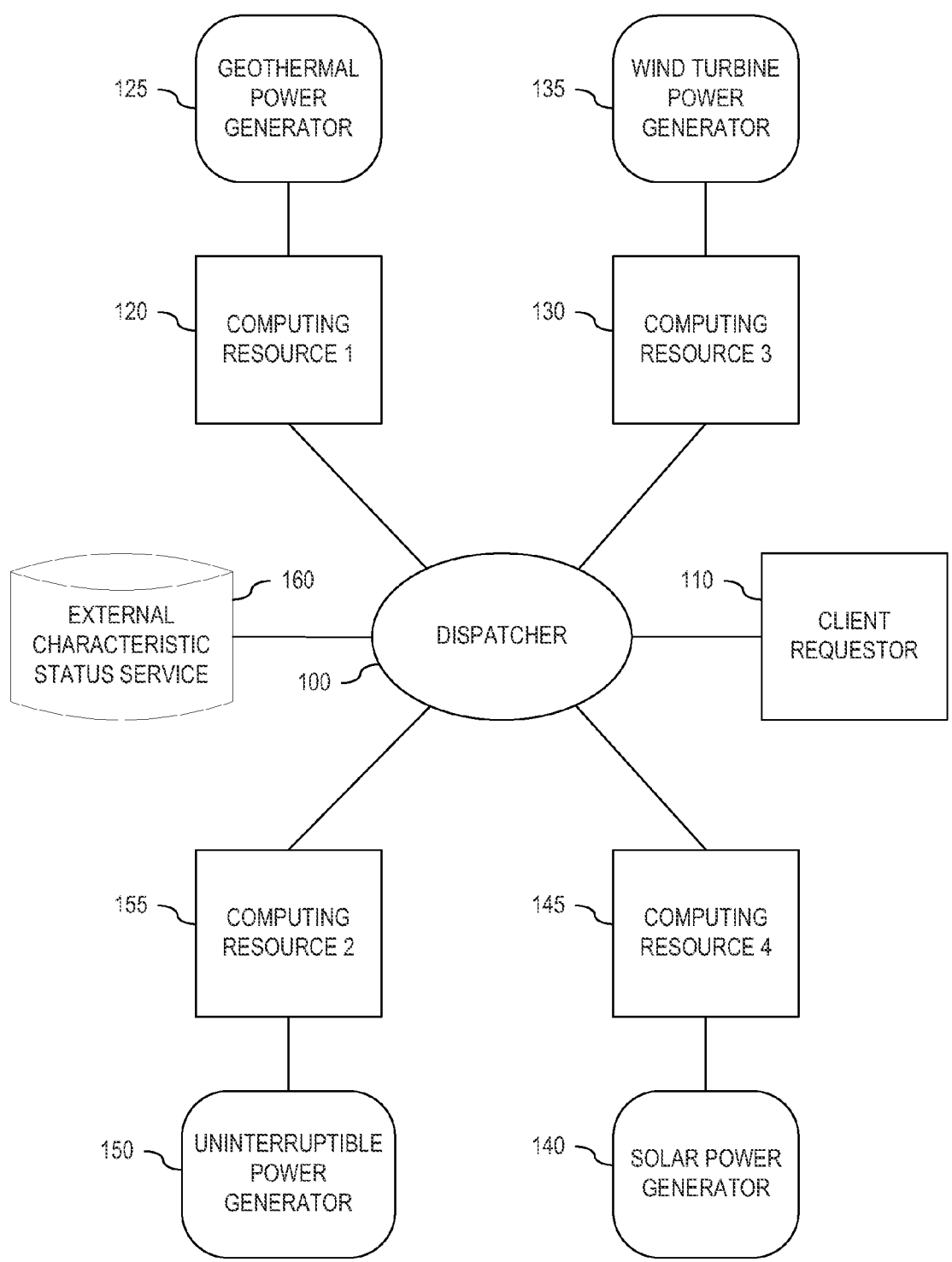
FIG. 1 shows a high level system diagram in which the present invention can be implemented.

FIG. 1. shows a high level system diagram in which the present invention can be implemented comprising:
a dispatcher (100);
a client requestor (110);
a computing resource 1 (120) consuming electric power which can be generated at least partially by a geothermal power generator (125);
a computing resource 2 (155) consuming electric power which can be generated at least partially by an uninterruptible power generator (150);
a computing resource 3 (130) consuming electric power which can be generated at least partially by a wind turbine power generator (135);
a computing resource 4 (145) consuming electric power which can be generated at least partially by a solar power generator (140); and
an external characteristic status service (160).

The dispatcher (100) receives from the client requestor (110) a computing task for execution. The dispatcher (100) then decides to which computing resource (120, 130, 145, 155) the computing task should be forwarded. as a function of different parameters or characteristics. In particular, the dispatcher (100) can rely on an external characteristic status service (160) to take the decision to route the computing task to a particular computing resource.

The client requestor (110) needs to have a computing task or workload executed by another system. The client requestor (110) can send the computing task to the dispatcher (100) directly for routing to the most suitable node, or it can send it to an execution service without any prior knowledge as to where or how the task may be executed. To have the computing task executed, the client requestor (110) can use any technology enabling convenient, on-demand network access to a shared pool of configurable computing resources that can be rapidly provisioned and released.

The dispatcher (100) can act as a proxy for such execution service, intercepting the computing task sent to it. The computing task may be implemented as a message or a JMS message sent to the dispatcher (100), where the message comprises all the data required to execute the task or pointers to where the data can be accessed from the computing resource executing the task, Optionally, the dispatcher (100) can modify the computing task so that the computing resource which will execute the computing task has direct access to the data. Furthermore the dispatcher (100) can instruct a data replicating service to copy or transfer the data to a geographic location close to the location of the computing resource which will execute the task. Once the task execution is completed, the result can be sent by the computing resource to the dispatcher (100) an that the dispatcher (100) transfers the result to the client requestor (110). Alternatively the dispatcher (100) can instruct the computing resource to send the result of the task execution directly to the client requestor (110), so as to avoid unnecessary network exchanges. The result can be sent to the client requestor (110) by using a callback method comprised in the computing task message or object. Different implementations are available to send the result of the execution of a computing task in a distributed computing environment.

A computing resource (120, 130, 145, 155) can be a single server, or a set of servers such as a blade centre. It can be virtual or real servers or be implemented as a cloud node in a cloud computing environment. A computing resource can be any type of computer with a network access. Furthermore, the computing capability or capacity of a computing resource can be adjusted based on the needs and the suitable of this computing resource. For example additional computing power can be obtained by adding computing items to a computing resource, such as adding servers in a data centre, or enabling processors in a server with on demand capability. Conversely the computing power of a computing resource can be reduced by disabling computing items or computing nodes in the computing resource. For example a server or a virtual machine which are part of a computing resource can be turned off. In general adding computing power to a computing resource will cause it to be able to compute more computing tasks, however it will also drain more electric power.

When the dispatcher (100) receives the computing task, the dispatcher (100) needs to determine which computing node will be the most suitable for executing the task. This determination will be described in more details with respect to FIG. 2. The dispatcher (100) can by to minimize the electric power consumed by the computing resource executing the task. Alternatively, the dispatcher (100) can try to minimize the computing power whose generation has a negative environmental impact. To that end, the dispatcher (100) can decide to route or dispatch the computing task to a computing node consuming electrical power generated using renewable energy in a greater proportion than other computing resources. The proportion of renewable energy used to generate electrical power can depend on the number of facilities for using renewable enemy, but also on external characteristics such as the weather or the time of the day, or the season. For example a wind. turbine power generator (135) will be more efficient when high winds are blowing. A solar power generator (140) will generate more power and more efficiently around noon local time, than in the middle of the night, or in slimmer than in winter. Furthermore the dispatcher (100) can also leverage information about the type of electric power consumed by each computing resource to redirect computing tasks towards geographic locations or computing resources where generated power would otherwise be wasted. For example an uninterruptible power generator (150), i.e. for example an uninterruptible power supply or a battery backup, must be discharged regularly so as to maintain their reliability and their life time. As an example if batteries must be discharded completely and then recharged about every 20 to 40 days, the optimizer will consider that power available between the 20th and 40th day from last cycle. The power which is not consumed during this discharge time is lost. Similarly, the capacity of electric grids and electric power generators is in general designed so as to handle peak or nearly peak demands. Thus during periods of lower demand such as night, a lot of electric power is wasted due to the extra capacity. Furthermore the cost of electric power is relatively low during the time periods when the electric power is abundant, whereas the cost is higher during peak periods. The time variation of the cost of electric can be used as an indicator as to when a particular site or computing resource can take advantage of the abundant power. The dispatcher (100) can also increase the computing capacity of a computing resource to consume more of electric power during the time when it would otherwise be wasted.

Information about the environment in which the power is generated can be obtained by the dispatcher (100) from the external characteristic status service (160). Such an external characteristic status service (160) can provide structured information on the current weather or weather forecast for a particular geographic location, but also about the time period corresponding to a discharge of uninterruptible power generator (150) for a particular computing resource such as computing resource 2 (155), or about the time zone in which a computing resource is located so as to take advantage of lower power demand during the night.

Hence each computing resource, server, or network apparatus has a renewable energy source associated with it (not necessarily exactly where the server is located), and, looking at the widely public weather condition and forecast or other external characteristic status, one can dispatch a request causing the less pollution while main tuning the agreed level of service.

The dispatcher (100) can have a keep-alive system to monitor the load over a computing resource. The request or computing task is dispatched according to the latest weather condition or the status of a particular external charactertic, so the renewable energy sources had the time to produce enough enemy. Each new request may not be forwarded to the less polluting server. Idle status or redundancy considerations could cause the dispatching of a request to a more polluting server, considered the cost of stand-by.

When first discovering the servers, a network route to the servers is detected. This route, involving router, switch, and network apparatus will have its own energy consumption or energy footprint and pollution too. The pollution associated with this route should be taken account. A recursive algorithm could be used to estimate or detect the less polluting network path to a computing resource.

Alternatively the dispatcher (100) can request the status of an external characteristic directly from a computing resource instead of relying on a centralized external characteristic status service (160). There can also be one external characteristic status service (160) for each external characteristic to be queried.

Figure 2:
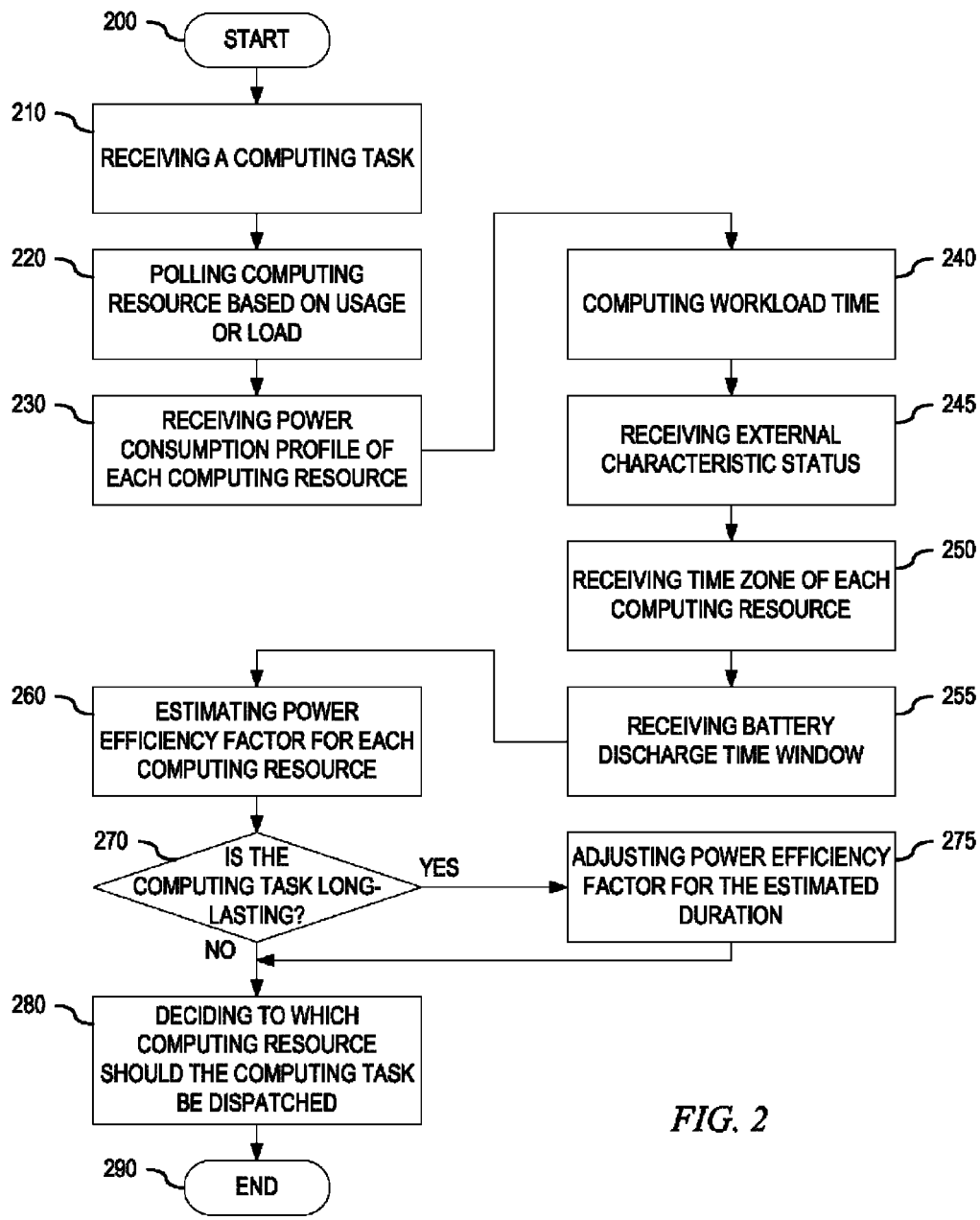
FIG. 2 shows a high level activity diagram presenting a flow for routing a computing task.

FIG. 2 shows a high level activity diagram presenting a flow for routing a computing task, comprising the steps of:
start (200);
receiving a computing task (210);
polling a computing resource based on its usage or load (220);
receiving a power consumption profile of each computing resource (230);
computing the workload, time for each computing resource (240);
receiving at least one external characteristic status for each computing resource (245);
receiving the time zone in which each computing resource is located (250);
receiving the battery discharge time window for each computer resource (255);
estimating a power efficiency factor for each computing resource (260);
determining whether the computing task is long lasting (270);

if it is, adjusting the power efficiency factor to take into account the estimated duration of the computing task (275);

in any case, deciding to which computing resource should the computing task be dispatched (280); and terminating the workflow (290).

After receiving a computing task (210) from a client requestor (110), the dispatcher (100) can determine which computing resource would be suitable for executing such task, taking into account their computing power, the software libraries Which may be available to the computing resource, and also its load, current or planned. Part of the information received, can comprise one or several timestamps representing moments in time when the execution of the computing resource can start. The timestamp can be used to compute a date and a time in the day, with different levels of precisions. The previous determination can be performed by polling each computing resource based on its usage or load (220). The power consumption profile of each resource is also received (230) by the dispatcher (100) either directly from the resource itself, or front a separate service, either local to the dispatcher (100) or remote. The power consumption profile comprises detailed information on the portion of electric power consumed by the resource which is generated using renewable energy and the portion which is generated using other non renewable energy such as fossil energy. The power consumption profile can also comprise information on the time period corresponding to low demand of electric power in the area of the computing resource, or it can comprise information on the time window for discharging the uninterruptible power generator (150). Alternatively this information can be obtained separately (245, 250, 255) from the computing resource itself or from a dedicated service such as a web service. The estimation of the duration of the computing task (240) can be performed by the dispatcher (100) or by the computing resource itself The estimation of the power efficiency factor associated with a computing resource can be performed by the dispatcher (100) or by a separate component (260). In a preferred embodiment computing resources available when the generated electric power is lost if not consumed have their power efficiency factor increased if the workload can be executed during the time window corresponding to the loss of surplus power. The power efficiency factor can be also increased proportionally to the amount of renewable energy used to generate the electric power used by the computing resource. In the case of a computing task which is long lasting (270), the power efficiency factor is adjusted to take into account variations of the environment over long period of time (275). For example the weather conditions can be expected to change given weather forecast if the task is expected to run for several hours or days. Similarly if the time period during Which electric power is abundant is relatively short with respect to the duration of the computing task, such a parameter may become irrelevant. Conversely if the time period during which electric power is abundant is relatively long with respect to the duration of the computing task, it becomes important to take this parameter into account.

Finally the dispatcher (100) can decide to Which computing node the computing task should be routed (280). The dispatcher (100) can rely exclusively on environmental parameters or can apply a weight to each parameter, whether it relates to the environment or not, so as to take a more balanced decision.

Furthermore different Co2 emission for the same computational power can lead. to different computational cost. A new metric can be put in place, for example MIPS per grams of CO2. This value is a part of a metric considered for dispatching request and workload.

Figure 3:
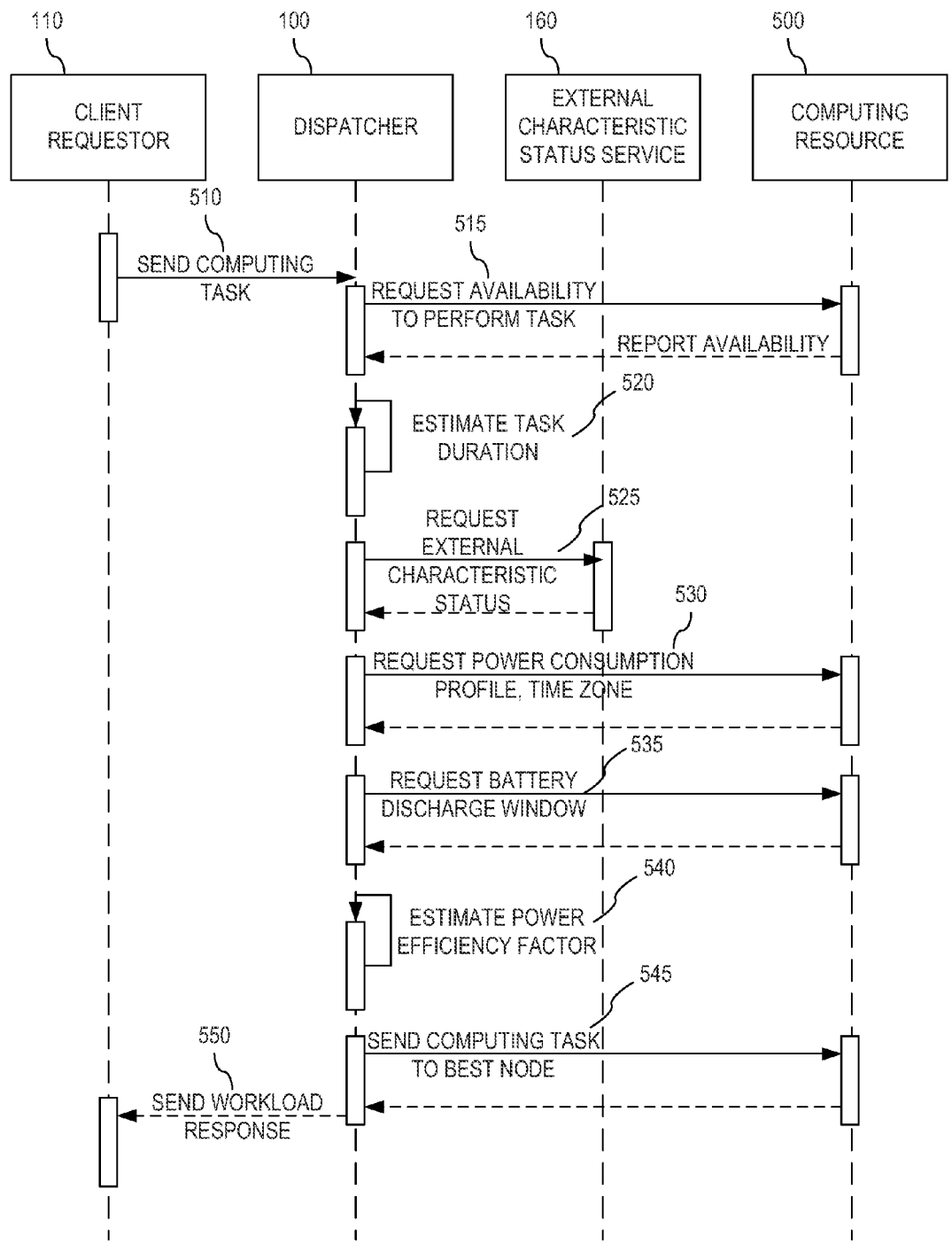
FIG. 3 shows a high level sequence diagram describing the interactions between different components for routing a computing task.

FIG. 3 shows a high level sequence diagram describing the interactions between different components for routing a computing task, comprising:

the client requestor (110) sending a computing task (510) to the dispatcher (100);

the dispatcher (100) requesting the availability of a computing resource (500) to perform the task (515), estimating the task duration (520) on each computing resource, requesting an external characteristic status (525) from the external characteristic status service (160), requesting the power consumption profile and the time zone (530) of each computing resource (500), requesting the battery discharge window (535) of each computing resource (500), estimating the power efficiency factor for each computing resource (540), sending the computing task for execution by the computing resource associated with the best power efficiency factor (515), and sending the workload response (550) to the client requestor (110).

Another embodiment comprises a method and system for routing a computing request to the computing node among several computing nodes connected by a network having the best electric power efficiency according to some preferences determined dynamically when the request is received or a priori by the requestor.

In yet another embodiment the invention can be deployed in one or more dispatcher components, so as to accommodate different sets of clients or users distributed across a wide area. The invention can be implemented by one or several components, including a dispatcher (100). Access to the components implementing the invention can be exposed as a cloud service, or using web services, http, REST, JMS, or any other remote or local method invocation techniques. The usage of the invention as a service can be metered and statistically analyzed either globally or on a user by user basis, or according to different categories such as the location of the user or client sending the request, the duration of the computing task. For each category, an affinity to one or several computing resources can be defined to represent that a computing resource has been often selected for executing computing tasks in a particular category. When a computing task is received by the dispatcher, the dispatcher can determine the likelihood that the computing task belongs to a category so determined, and can decide to route directly the computing task to the computing resource with the highest affinity. The location of the system implementing the invention may not be as important as the location of a computing resource.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A method for routing a computing task to a computing resource for executing the computing task, the method comprising:
   receiving, by a dispatcher, a timestamp at which execution of the computing task can start on the computing resource and a duration that the execution would take, wherein the computing resource has an associated power consumption profile and wherein the power consumption profile comprises a portion of electric power consumed by the computing resource generated using renewable energy and a portion of electric power consumed by the computing resource generated using other non-renewable energy;
   estimating, by the dispatcher, a power efficiency factor as a function of the power consumption profile for the computing resource, the timestamp and the duration thereby forming an estimated power efficiency factor for the computing resource at the time identified by the timestamp and for the duration;
   determining, by the dispatcher, whether the computing resource can execute the computing task as a function of the estimated power efficiency factor at the time identified by the timestamp and for the duration; and
   responsive to determining that the computing resource can execute the computing task at the time identified by the timestamp and for the duration, sending, by the dispatcher, the computing task to the computing resource.

2. The method of claim 1, wherein the computing resource can receive power from means for providing uninterruptible power, and wherein the power efficiency factor increases during the time period when the means for providing uninterruptible power can be discharged.

3. The method of claim 1, wherein the computing resource is in a geographic location where consumption of power is relatively low over a first period of time, and wherein the power efficiency factor increases during the first period.

4. The method of claim 1, wherein the power efficiency factor increases with the proportion of the renewable energy used to generate the power consumed by the computing resource.

5. The method of claim 1, further comprising:
   receiving, by the dispatcher, a status of a characteristic external to the computing resource thereby forming a external characteristic status; and
   at the step of estimating the power efficiency factor, estimating, by the dispatcher, the power efficiency factor as a function of the power consumption profile for the computing resource, the timestamp, the duration and the external characteristic status.

6. The method of claim 5, wherein the external characteristic status is a weather forecast corresponding to a time period during which the computing task will be executed on the computing resource and wherein the power efficiency factor increases if the expected weather improves the efficiency of the means for producing the renewable energy used to generate the power consumed by the computing resource.

7. The method of claim 1, wherein a further computing resource is suitable for executing the computing task, the further computing resource being associated with a further power consumption profile, the method further comprising:
   estimating, by the dispatcher, a further power efficiency factor as a function of the further power consumption profile for the further computing resource, the timestamp and the duration thereby forming a further estimated power efficiency factor for the further computing resource at the time identified by the timestamp and for the duration;
   determining, by the dispatcher, a best power efficiency factor by comparing the estimated power efficiency factor for the computing resource at the time identified by the timestamp and for the duration to the further estimated power efficiency factor for the further computing resource at the time identified by the timestamp and for the duration; and
   sending, by the dispatcher, the computing task to either the computing resource or the further computing resource based on the determination of the best power efficiency factor.

8. The method of claim 7, comprising the further step of enabling an additional computing resource at a same geographic location as a geographic location of either the computing resource or the further computing resource associated with the best power efficiency factor.

9. The method of claim 1, wherein the computing resource is at least one of:
   a computer server,
   a blade server,
   a virtualized server,
   a data centre, or
   a cloud node.

* * * * *